UNITED STATES PATENT OFFICE.

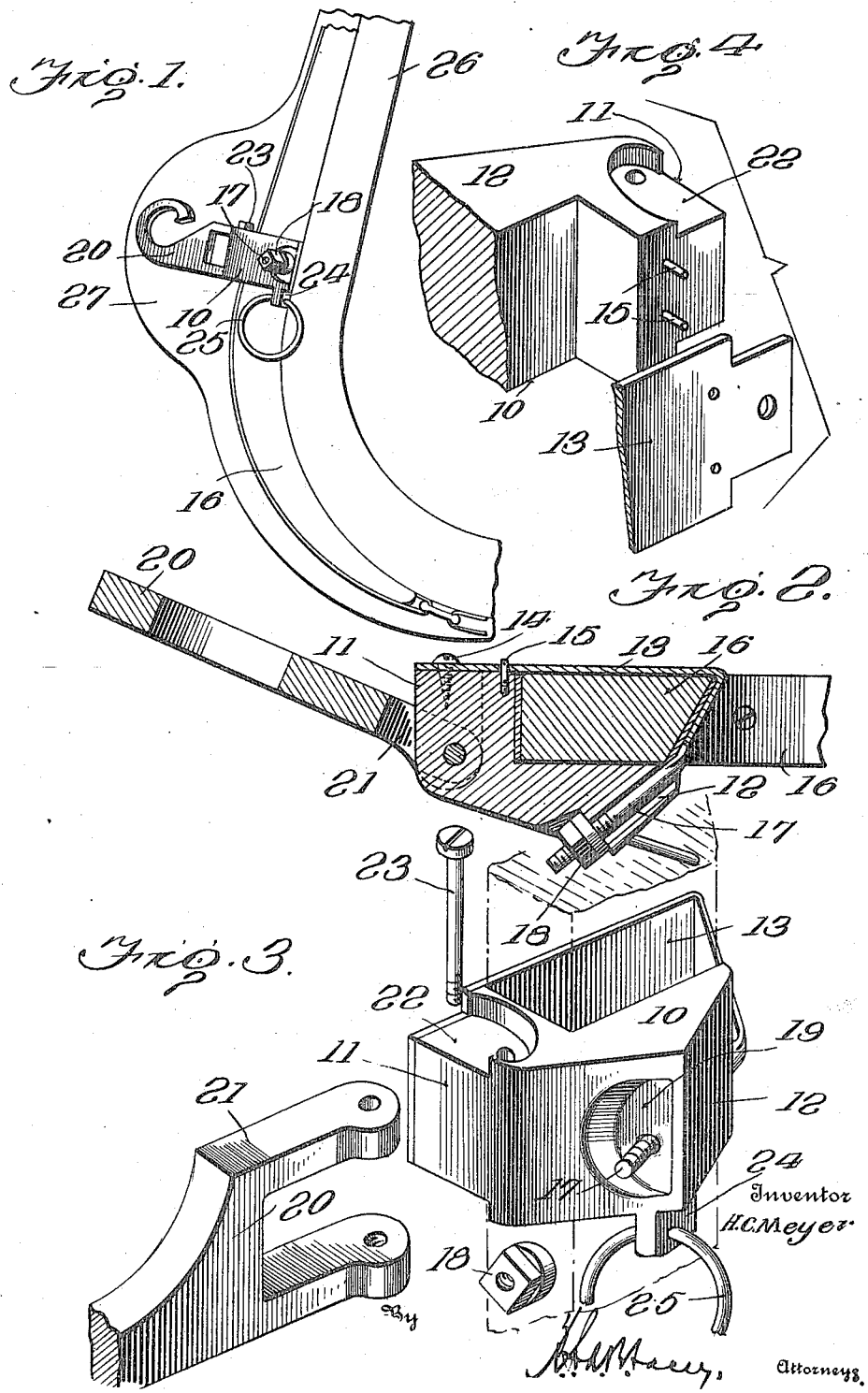

HENRY C. MEYER, OF SOUTH FORK, PENNSYLVANIA.

HAME-TUG.

1,198,141. Specification of Letters Patent. Patented Sept. 12, 1916.

Application filed November 3, 1915. Serial No. 59,401.

*To all whom it may concern:*

Be it known that I, HENRY C. MEYER, a citizen of the United States, residing at South Fork, in the county of Cambria and State of Pennsylvania, have invented certain new and useful Improvements in Hame-Tugs, of which the following is a specification.

This invention contemplates an improved hame tug and has as its primary object to provide a device of this character which may be adjusted longitudinally of the hame into proper coöperative relation to the shoulder of the draft animal, so that the draft upon the hame will occur at the proper point and the shoulder of the animal thus prevented from becoming sore.

The invention has as a further object, in this connection, to provide a construction wherein the tugs of a pair of hames may be adjusted, when the hames are used upon different draft animals, to the requirements of each individual animal, thus adapting a single pair of hames for general use. And a still further object of the invention is to provide a device of this character which will be simple in construction; which may be readily applied to any conventional type of hame without the necessity of structural change therein and which, when applied, will efficiently grip the hame to provide a rigid and durable structure.

Other and incidental objects will appear as the description proceeds and in the drawings wherein I have illustrated the preferred embodiment of the invention and wherein similar reference characters designate corresponding parts throughout the several views, Figure 1 is a fragmentary elevation showing my improved tug in connection with a hame collar, Fig. 2 is a horizontal sectional view more particularly showing the structural details of the device as well as the manner in which the tug is applied to the hame, Fig. 3 is a perspective view partly broken away and more particularly showing the construction of the body portion of the device, and Fig. 4 is a fragmentary perspective view showing the manner in which the bail of the device is fixed at one end to the body portion thereof.

In carrying out my invention, I employ a body portion 10 cut away to provide angularly disposed arms 11 and 12 respectively. Connected at one end to the arm 11 is a bail 13 detachably secured to the free end of said arm by a screw or other suitable fastening device 14. Coöperating with the fastening device 14 are spaced pins 15 extending through the adjacent terminal of the bail and into the arm 11 for securely holding the bail fixed to the arm.

In order to clearly illustrate the manner in which the device is applied to a hame, I have conventionally shown a hame at 16. The arm 11 is arranged to abut the outer edge of the hame as particularly shown in Fig. 2 with the arm 12 seating against the front face of the hame and with the bail 13 extending around the hame to coöperate with the said arms. At its free extremity, the bail 13 is reduced to provide a shank 17 which is loosely received within a suitable opening formed in the free end of the arm 12 and is screw threaded to receive a nut 18 engaging within a suitable recess 19 formed in the arm. As will now be clear, by properly rotating the nut 18, the bail may be adjusted to tightly clamp the body portion in position upon the hame.

Connected to the body portion 10 is a trace engaging element or hook 20. While I have illustrated the use of a hook, still, it will be understood that this trace engaging element may be of any suitable character such as an eye or any other desired form of device for connecting a trace with the body portion. The hook 20 is provided with a suitable shank having spaced arms 21 formed thereon embracing the upper and lower edges of the arm 11 of the body portion 10 and freely received in suitable recesses 22 formed therein. Swingingly connecting the hook with the body portion and extending through the arms thereof is a suitable pivot pin 23 arranged to extend freely through one of the arms 21 and through the body portion while the lower terminal of the said pin is screw threaded to engage the other arm of the hook. By this arrangement, the hook 21 will be supported in proper operative position relative to the hame 16 as more particularly shown in Fig. 2 and should the said hook become broken, it may be readily detached from the body portion of the device to be either repaired or renewed.

Depending from the lower side of the body portion 10 and connected to the arm 12 thereof, is a lug 24 which freely supports a ring 25. The lug 24 is so arranged relative to the arms of the body portion that when the device is applied to a hame, the ring 25 will normally lie against the outer face of the hame, as more particularly shown in Fig. 1. The ring 25 is, as will be readily understood, adapted to receive a yoke strap or trace chain.

In Fig. 1 of the drawings, I have shown my improved device in connection with a conventional type of collar 26 which is, as is usual, provided with an enlarged or bulged portion 27 arranged to fit over the shoulder of a draft animal. As will be readily understood, this enlarged portion will occur at different points longitudinally of the hame when the hame is used in connection with different sized collars. The value of the present invention will now become at once apparent since it will be seen that the hame tug may, by properly manipulating the nut 18, be adjusted longitudinally of the hame to come directly over such enlarged portion of the collar so that the draft upon the collar, with reference to the shoulder of the draft animal, will be properly located and the shoulder of the draft animal thus prevented from becoming sore. Moreover, it will also be seen that a single pair of hames equipped with a pair of my improved hame tugs may be readily employed upon draft animals of different sizes and the tugs easily adjusted with reference to the shoulders of each individual animal.

While I have shown my improved device in connection with a hame having flat faces, still, it will be understood that by properly cutting away the body portion 10 to provide the arms 11 and 12 of the device, the said arms may be formed to fit around a hame of practically any contour and in such event, the bail 13 would, of course, be formed to properly coöperate with the arms 11 and 12 to engage around the hame. However, in this connection, it is desired to direct particular attention to the fact that the arm 11 seats flatly against the outer edge of the hame and is adapted to bear against the said edge to coöperate with the bail 13 in supporting rearward stress upon the hook 20. This arrangement contributes to the provision of a rigid and durable structure and it will be noted that the arm 12 is thickened toward its free end so as to efficiently support incidental stress thereon.

It will therefore be seen that I provide a very simple and efficient construction for the purpose set forth and a device which may be readily applied to any conventional type of hame without the necessity of structural change therein.

Having thus described my invention, what I claim and desire to secure by Letters Patent is:

1. A device of the character described including a body portion provided with arms one thickened toward its free end to provide a seat, a trace engaging element carried by the body portion, a bail fixed to one of said arms and coacting with the other arm, and means coacting with said seat and engaging the bail for clamping the bail about a hame to connect the body portion thereto with the arms of the body portion seating against adjacent faces of the hame to support the trace engaging element in operative position relative to the hame.

2. A device of the character described including a body portion provided with an arm having an opening formed therein, a trace engaging element carried by the body portion, a bail carried by the body portion and provided with a shank extending freely through said opening, and a nut carried by the shank and engaging said arm for clamping the bail about a hame with the body portion seating thereagainst to support the trace engaging element in operative position relative to the hame.

3. A device of the character described including a body portion provided with coacting arms, a trace engaging element connected to one of said arms, the other of said arms being formed to provide a seat, a bail fixed to said first mentioned arm and freely fitted through the said last mentioned arm, and means disposed in said seat and adjustable upon the bail for clamping the bail about a hame with the body portion disposed to support the trace engaging element in operative position.

4. A device of the character described including a body portion, a trace engaging element carried thereby, a bail, means connecting one extremity of the bail to the body portion with the opposite end of the bail adapted to fit around a hame to clamp the body portion thereto with the said body portion disposed to support the trace engaging element in operative position, and reinforcing means coacting with said first mentioned means for connecting the said end of the bail with the body portion.

5. A device of the character described including a body portion, a trace engaging element carried thereby, a bail, means connecting one extremity of the bail with the body portion with the opposite extremity of the bail adapted to fit around a hame to clamp the body portion thereto with the body portion adapted to support the trace engaging element in operative position, and a pin extending through the bail to coöperate with the said means in connecting the said first mentioned extremity of the bail with the body portion.

In testimony whereof, I affix my signature.

HENRY C. MEYER. [L. S.]